United States Patent
Boaz et al.

(10) Patent No.: US 9,835,282 B2
(45) Date of Patent: Dec. 5, 2017

(54) DRAIN FITTINGS FOR IRRIGATION SYSTEMS

(71) Applicant: Blazing Products, Inc., Chesterfield, MO (US)

(72) Inventors: Aaron Boaz, St. Louis, MO (US); Sean Hansen, Grand Island, NE (US); Duane K. Smith, St. Charles, MO (US)

(73) Assignee: Blazing Products, Inc., Chesterfield, MO (US)

( * ) Notice: Subject to any disclaimer, the term of this patent is extended or adjusted under 35 U.S.C. 154(b) by 0 days.

(21) Appl. No.: 14/691,071

(22) Filed: Apr. 20, 2015

(65) Prior Publication Data

US 2015/0300543 A1 Oct. 22, 2015

Related U.S. Application Data

(60) Provisional application No. 61/982,312, filed on Apr. 21, 2014.

(51) Int. Cl.
*F16L 55/07* (2006.01)
*E03B 7/08* (2006.01)
*F16L 25/14* (2006.01)

(52) U.S. Cl.
CPC .............. *F16L 55/07* (2013.01); *E03B 7/08* (2013.01); *F16L 25/14* (2013.01)

(58) Field of Classification Search
CPC .......... E02B 11/00; A01G 25/06; F16L 55/07; F16L 25/14; E03B 7/08
USPC .... 4/289, 688; 285/119, 390, 397, 303, 290; 137/544, 550; 210/429, 432, 446, 460, 210/470; 405/36; 251/368, 149.1; 290/553, 590; 239/590, 553
See application file for complete search history.

(56) References Cited

U.S. PATENT DOCUMENTS

| | | | | |
|---|---|---|---|---|
| 1,812,916 A | * | 7/1931 | Zerk | F16N 27/005 138/41 |
| 3,608,735 A | * | 9/1971 | Smith | E03C 1/086 210/449 |
| 4,342,337 A | | 8/1982 | Underwood | |
| 4,890,640 A | * | 1/1990 | King, Sr. | F16K 15/141 137/512.4 |
| 4,953,581 A | * | 9/1990 | Patterson | A01G 25/16 137/107 |
| 5,080,527 A | | 1/1992 | King, Sr. | |
| 5,163,779 A | * | 11/1992 | King, Sr. | A01G 25/16 137/107 |
| 5,640,991 A | | 6/1997 | King | |

(Continued)

*Primary Examiner* — Craig Schneider
*Assistant Examiner* — Angelisa L Hicks
(74) *Attorney, Agent, or Firm* — Harness, Dickey & Pierce, P.L.C.

(57) ABSTRACT

A drain fitting for use in an irrigation system for draining water from the irrigation system, regardless of pipe size in the irrigation system, generally includes a grip portion and a neck coupled to the grip portion. The neck defines a first engagement portion having a first diameter, for coupling the drain fitting to a pipe of the irrigation system having a diameter corresponding to the first diameter of the first engagement portion, and a second engagement portion having a second diameter, different from the first diameter, for coupling the drain fitting to a pipe of the irrigation system having a diameter corresponding to the second diameter of the second engagement portion.

17 Claims, 8 Drawing Sheets

(56) References Cited

U.S. PATENT DOCUMENTS

| | | | |
|---|---|---|---|
| 5,694,972 A | 12/1997 | King | |
| 5,762,671 A * | 6/1998 | Farrow | B01D 35/306 |
| | | | 210/232 |
| 5,964,241 A | 10/1999 | King | |
| 6,363,579 B1 | 4/2002 | King, Jr. | |
| 6,681,796 B2 * | 1/2004 | King, Jr. | F16L 41/065 |
| | | | 137/107 |
| 6,846,412 B2 * | 1/2005 | Hogan | B01D 29/01 |
| | | | 210/227 |
| 6,886,585 B1 | 5/2005 | King, Jr. et al. | |
| 7,377,286 B2 | 5/2008 | King, Jr. et al. | |

\* cited by examiner

DRAIN FITTINGS FOR IRRIGATION SYSTEMS

CROSS-REFERENCE TO RELATED APPLICATION

This application claims the benefit of, and priority to, U.S. Provisional Patent Application No. 61/982,312, filed on Apr. 21, 2014. The entire disclosure of the above application is incorporated herein by reference.

FIELD

The present disclosure generally relates to drain fittings and, more particularly, to drain fittings for irrigation systems.

BACKGROUND

This section provides background information related to the present disclosure which is not necessarily prior art.

Underground irrigation systems are often used to direct water to vegetation to help facilitate growth of the vegetation. Typically, the underground irrigation systems include main water lines and lateral lines extending therefrom. The lateral lines are connected to the main lines through various water zone valves, and interconnect the main lines with one or more sprinkler heads for distributing the water to the vegetation.

SUMMARY

This section provides a general summary of the disclosure, and is not a comprehensive disclosure of its full scope or all of its features.

Exemplary embodiments of the present disclosure generally relate to drain fittings for use in irrigation systems, regardless of pipe size in the irrigation system, for draining water from the irrigation systems. In one exemplary embodiment, such a drain fitting generally includes first and second threaded engagement portions for use in coupling the drain fitting to the irrigation system. The first engagement portion has a first diameter, and the second engagement portion has a second diameter different from the first diameter.

In another exemplary embodiment, a drain fitting of the present disclosure generally includes a grip portion, and a neck coupled to the grip portion. The neck defines a first engagement portion having a first diameter, for coupling the drain fitting to a pipe of the irrigation system having a diameter corresponding to the first diameter of the first engagement portion. And, the neck also defines a second engagement portion having a second diameter, different from the first diameter, for coupling the drain fitting to a pipe of the irrigation system having a diameter corresponding to the second diameter of the second engagement portion.

In another exemplary embodiment, a drain fitting of the present disclosure generally includes at least two threaded engagement portions, each having a different diameter and each capable of coupling the drain fitting to a different pipe of the irrigation system, wherein each of the different pipes of the irrigation system has a different diameter.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference names indicate corresponding parts throughout the several views of the drawings.

DETAILED DESCRIPTION

The description and specific examples provided herein are intended for purposes of illustration only and are not intended to limit the scope of the present disclosure.

Exemplary embodiments of the present disclosure generally relate to drain fittings, for example, for use in irrigation systems used to direct water to vegetation. In regions where the ground freezes, it is necessary to drain the irrigation systems at the beginning of the winter season to protect the irrigation systems, and their various components, from freeze damage. As will be described, the drain fittings of the present disclosure can be used in the irrigation systems to drain the water therefrom (e.g., from main lines of the irrigation systems, etc.). In addition, the drain fittings can be used adjacent, around, or in connection with, particular components of the irrigation systems (e.g., near lateral lines, on lateral line, adjacent sprinkler heads, adjacent back flow preventers, etc.). In some aspects, this can help provide protection to the irrigation systems against water freezing therein (e.g., against water freezing in the main lines of the irrigation systems, etc.), and against freeze damage to the irrigation systems and their various components.

With reference now to the drawings, FIGS. 1-12 illustrate an exemplary embodiment of a drain fitting 100 including one or more aspects of the present disclosure.

Figure 1:
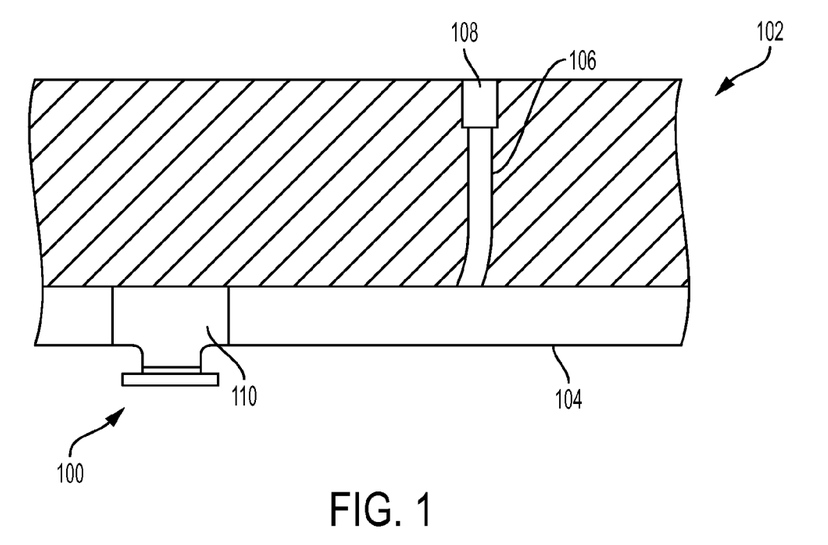
FIG. 1 is a side elevation view of an exemplary embodiment of a drain fitting of the present disclosure, shown installed in an irrigation system.
Figure 2:
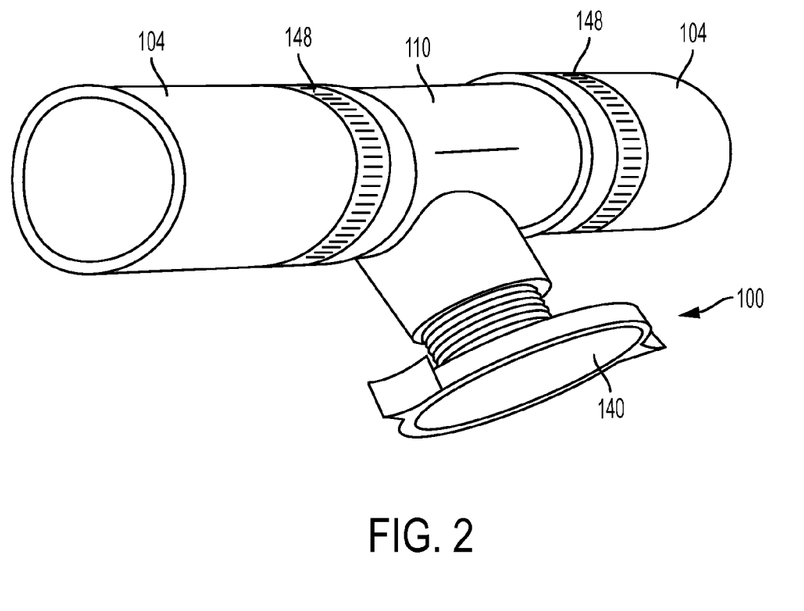
FIG. 2 is an enlarged perspective view of the drain fitting of FIG. 1, shown in stalled in the irrigation system.
Figure 3:
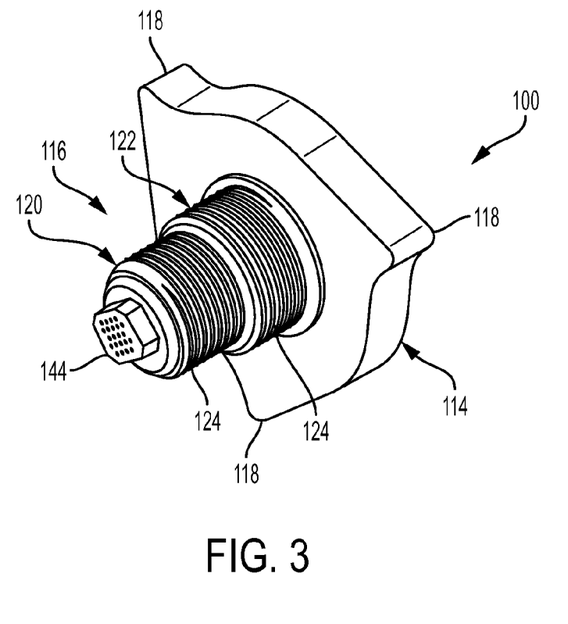
FIG. 3 is a perspective view of the drain fitting if FIG. 1.
Figure 4:
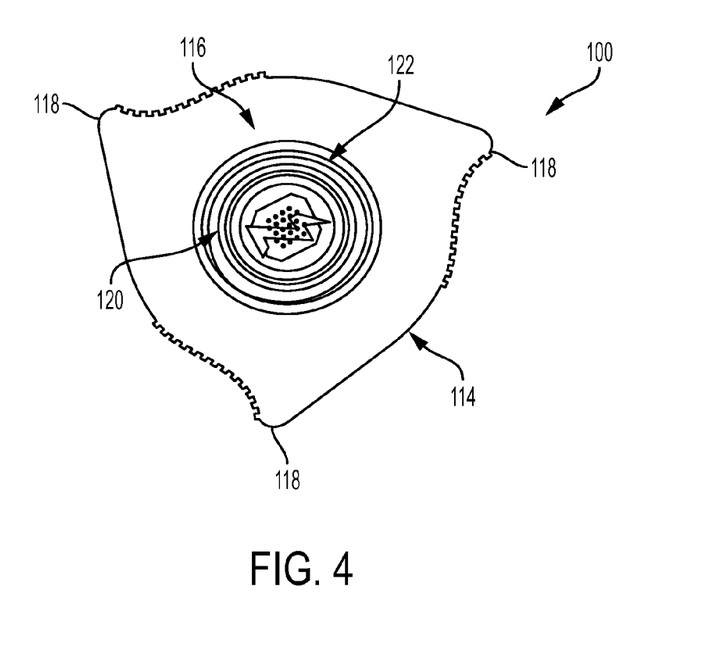
FIG. 4 is a top plan view of the drain fitting of FIG. 3.
Figure 5:
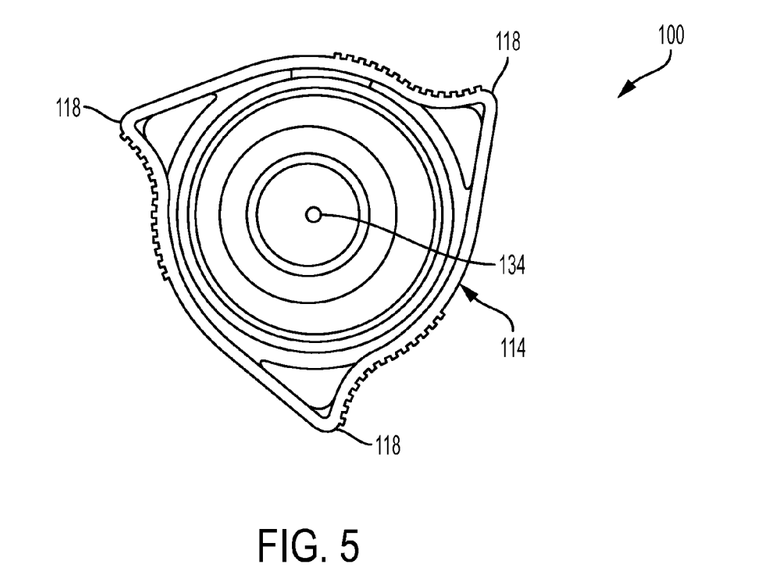
FIG. 5 is a bottom plan view of the drain fitting of FIG. 3, with a filter of the drain fitting removed.
Figure 6:
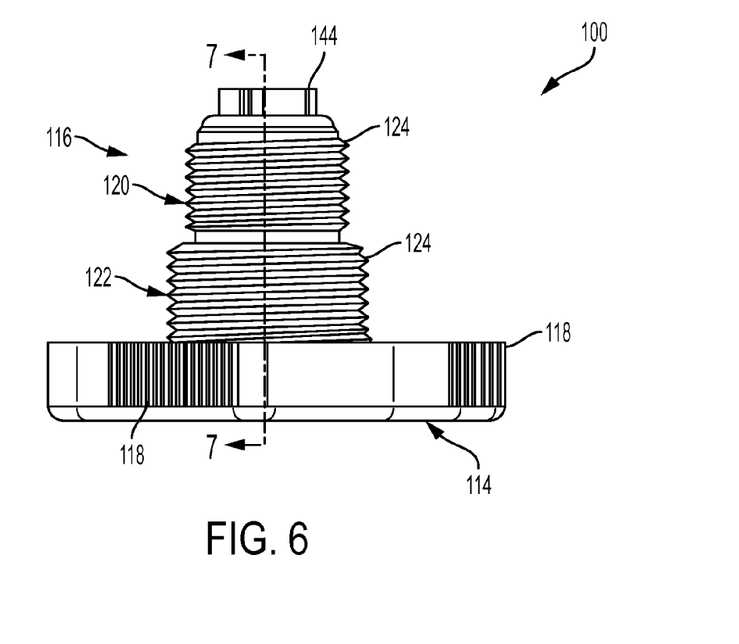
FIG. 6 is a side elevation view of the drain fitting of FIG. 3.

As shown in FIGS. 1 and 2, the illustrated drain fitting 100 is configured for use in an underground irrigation system 102. The illustrated irrigation system 102 generally includes a main water line 104 (e.g., constructed from polyvinyl chloride (PVC), polyethylene, etc.), multiple lateral lines (e.g., lateral line 106, etc.) (e.g., constructed from polyethylene, etc.) extending from the main line 104 (e.g., via water zone valves, etc.), and sprinkler heads (e.g., sprinkler head 108, etc.) coupled to the lateral lines. And in use, water pressure in the irrigation system 102 may range from about 20 pounds per square inch (psi), when municipal water sources are used to feed the system 102, to about 80 psi or more, when booster pumps are used to feed water to the system 102. In various aspects, the drain fittings of the present disclosure (e.g., drain fitting 100, etc.) are rated to accommodate pressures up to about 2,000 psi.

The drain fitting 100 is configured for installation to the main line 104 of the irrigation system 102 via a T-fitting 110. The drain fitting 100 can then be used to drain water from the main line 104 (and, indirectly, from the lateral lines (e.g., the lateral line 106, etc.) and the sprinkler heads (e.g., the sprinkler head 108, etc.) of the irrigation system 102), through the T-fitting 110, when the irrigation system 102 is not in use. As can be appreciated, such draining of the water can help provide protection to the irrigation system 102 against water freezing in the main line 104, the lateral lines (e.g., the lateral line 106, etc.), and the sprinkler heads (e.g., the sprinkler head 108, etc.) during cooler weather. And in some aspects, the drain fitting 100 can eliminate the need to manually drain the irrigation system 102 in the fall/winter season. Any suitable T-fitting 110 may be used with the irrigation system 102 and drain fitting 100. And generally, the T-fitting 110 will match the size of the main line 104 of the irrigation system 102 (e.g., where a typical diameter size of the T-fitting 110 and the main line 104 may be about 0.5 inches, 0.75 inches, etc.). With that said, it should be appreciated that the drain fitting 100 can also be used in irrigation systems, in some embodiments, through couplings other than T-fittings. For example, the drain fitting 100 may be coupled to main lines, lateral lines, etc. at the ends of the lines, or the drain fitting 100 may be could directly to sprinkler heads, etc.

With reference to FIGS. 3-7, the illustrated drain fitting 100 generally includes a grip portion 114 for grasping the drain fitting 100 and a neck 116, extending away from the grip portion 114, for coupling the drain fitting 100 to the T-fitting 110 of the main line 104. In the illustrated embodiment, the grip portion 114 includes wings (each indicated at 118) to facilitate grasping, engaging, etc. the grip portion 114 (e.g., by hand, with a tool, etc.), for example, when inserting the drain fitting 100 into the T-fitting 110, etc. However, in other exemplary embodiments, grip portions may be shaped differently as desired (e.g., with differently shaped wings, with different numbers of wings, without wings, etc.). The drain fitting 100 can be constructed from any suitable materials within the scope of the present disclosure including, for example, plastics, metals, combinations thereof, etc. In addition, the drain fitting 100 may include a one-piece construction, such that the grip portion 114 and the neck 116 are unitarily formed. Or, the drain fitting 100 may be constructed from separate components (e.g., a separate grip portion and a separate neck, etc.) that are then subsequently coupled together. In some aspects, the grip portion 114 and the neck 116 may be viewed as defining a body of the drain fitting 100.

Figure 9:
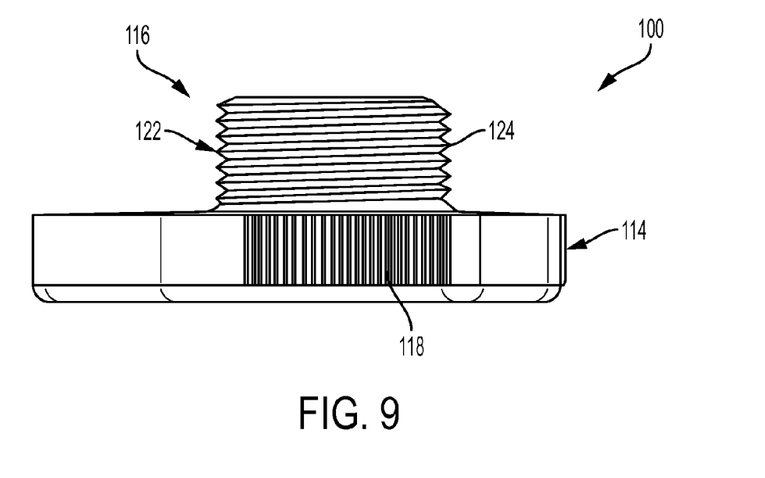
FIG. 9 is a side elevation view of the drain fitting of FIG. 3, with an upper engagement portion of the drain fitting removed.
Figure 10:
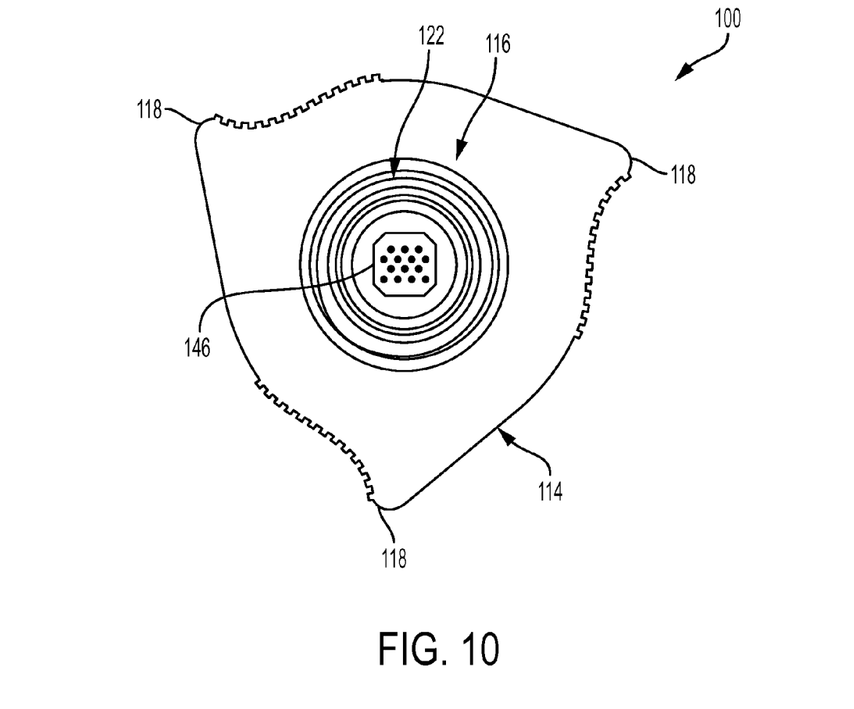
FIG. 10 is a top plan view of the drain fitting of FIG. 9.

The neck 116 of the drain fitting 100 includes two engagement portions 120, 122 for use in coupling the drain fitting 100 to the T-fitting 110 of the main line 104. External threads 124 are disposed around the two engagement portions 120, 122 and are configured to mate with internal threads defined within the T-fitting 110, such that the drain fitting 100 can be threaded into the T-fitting 110 as desired (e.g., into an opening defined by the T-fitting 110 as shown in FIGS. 1 and 2, etc.). As can be seen, in the illustrated embodiment, the two engagement portions 120, 122 each have a different size (e.g., a different diameter, etc.). An upper engagement portion 120 (as viewed in FIGS. 6 and 7) is generally smaller in size (e.g., has a smaller diameter, etc.) than a lower engagement portion 122. The engagement portions 120, 122 may be viewed as being generally tiered or stepped, etc. And as such, the upper engagement portion 120 can be used to couple the drain fitting 100 to a T-fitting having a smaller opening (where the upper engagement portion 120 of the drain fitting 100 would thread into an opening of the T-fitting, up to the lower engagement portion 122 which would then generally abut an outer surface of the T-fitting). And, the lower engagement portion 122 can be used to couple the drain fitting 100 to another T-fitting having a larger opening (where the upper engagement portion 120 would then extend into the opening of the T-fitting to allow the lower engagement portion 122 to couple the drawing fitting 100 to the T-fitting, or where the upper engagement portion 120 could be removed (e.g., separated, cut, etc.) from the lower engagement portion 122 as shown in FIGS. 9 and 10). As can be appreciated, this allows the drain fitting 100 to be installed in different T-fittings, generally regardless of the opening size provided in the T-fittings for receiving the drain fitting 100 (e.g., the same drain fitting 100 can be used with at least two different sizes of T-fittings, etc.).

In the illustrated embodiment, the upper engagement portion 120 of the drain fitting 100 includes a 0.5 inch diameter (with threads 124 extending there around) and the lower engagement portion 122 includes a 0.75 inch diameter (with threads 124 extending there around). As such, the drain fitting 100 can be used with T-fittings having either 0.5 inch diameters or 0.75 inch diameters (and thus in systems with main lines having either 0.5 inch diameters or 0.75 inch diameters—as the T-fittings will likely be the same size as the main lines in which they are installed). However, it should be appreciated that drain fittings could include necks with engagement portions having other sizes within the scope of the present disclosure (e.g., 0.25 inch sizes, 1.0 inch sizes, other sizes, etc.). Further, it should be appreciated that drain fittings could include necks having more than two differently sized engagement portions (e.g., three or more differently sized engagement portions, etc.), or even necks with engagement portions that gradually change in size (e.g., that change generally linearly, that are generally triangular shaped or conical shaped, etc.) for fitting substantially any size opening.

Figure 7:
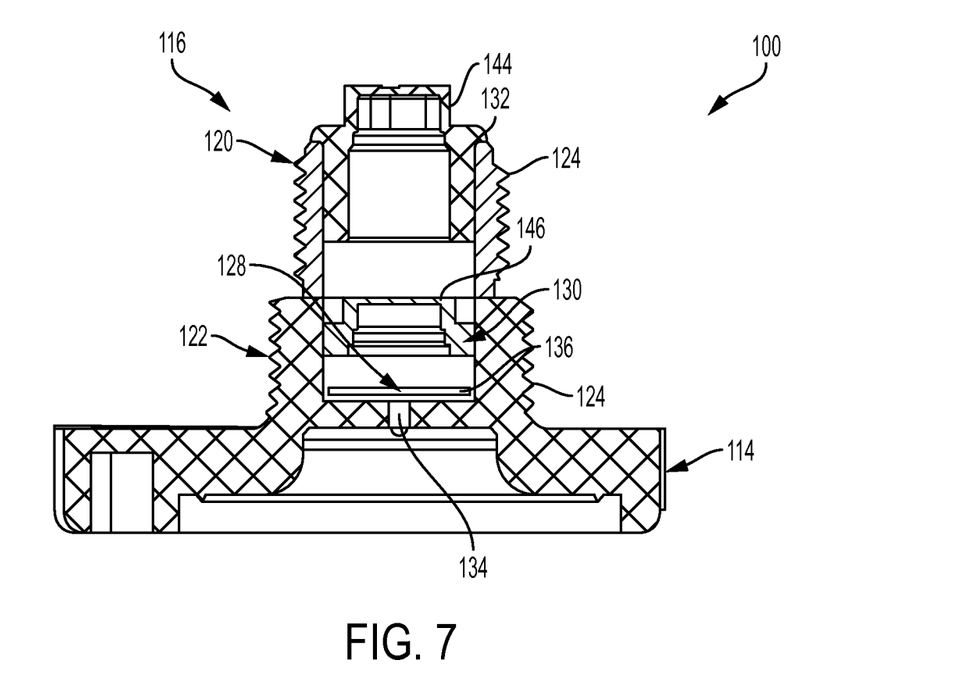
FIG. 7 is a section view of the drain fitting of FIG. 3 taken in a plane including line 7-7 in FIG. 6.
Figure 8:
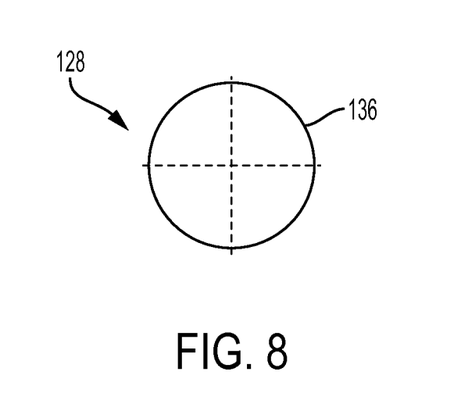
FIG. 8 is a bottom plan view of a valve portion of the drain fitting of FIG. 3.

With reference now to FIGS. 7 and 8, the illustrated drain fitting 100 also includes a valve assembly 128 disposed generally within the neck 116, between the neck 116 and the grip portion 114. The valve assembly 128 is located within a channel 130 extending through the drain fitting 100, generally between an inlet 132 of the drain fitting 100 and an outlet 134 of the drain fitting 100. In operation, the valve assembly 128 is configured to close (and inhibit water from leaving the irrigation system 102 through the drain fitting 100) when the irrigation system 102 is in use (e.g., when water pressure in the main line 104 of the irrigation system 102 is greater than about 10 psi to about 15 psi, etc.). And, the valve assembly 128 is configured to open (and drain water from the irrigation system 102 through the drain fitting 100) when the irrigation system 102 is not in use (e.g., when water pressure in the main line 104 of the irrigation system 102 is less than about 10 psi to about 15 psi, etc.).

Any suitable valve assembly may be used in connection with the drain fitting 100 (e.g., a check valve, etc.). For example, in the illustrated embodiment, the valve assembly 128 includes a generally flat, disc-shaped valve portion 136. In various aspects, the valve portion 136 operates as a diaphragm to selective allow and inhibit water flow through the drain fitting 100. In other exemplary embodiments, other valve assemblies may be used including, for example, valve assemblies that make use of valve balls (e.g., as described in U.S. Pat. No. 5,964,241, which is incorporated herein by reference in its entirety), etc.

The illustrated drain fitting 100 also includes features that help inhibit unwanted debris (e.g., dirt, sand, roots, etc.) from entering the drain fitting 100 through the inlet 132 and the outlet 134 and interfering with operation. For example, a filter 140 is located adjacent the valve assembly 128, generally within the grip portion 114 of the drain fitting 100, to help inhibit water backflow from carrying debris from outside the drain fitting 100 into the valve assembly 128 (via the outlet 134), where it could interfere with proper functioning of the valve assembly 128. And, a grate (not shown) is provided generally over the filter 140 to help hold the filter 140 in place (and inhibit larger debris from damaging the filter 140). The filter 140 may be formed from any suitable material including, for example, non-woven polyester, etc.

Figure 11:
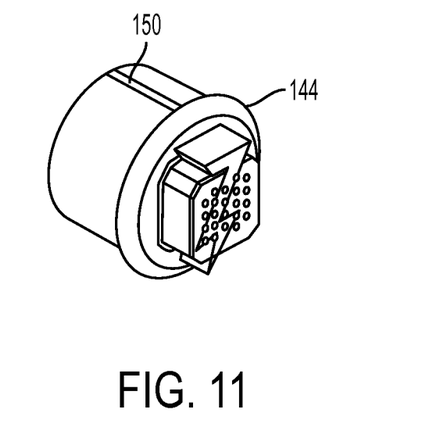
FIG. 11 is a perspective view of an upper screen portion of the drain fitting of FIG. 3.
Figure 12:
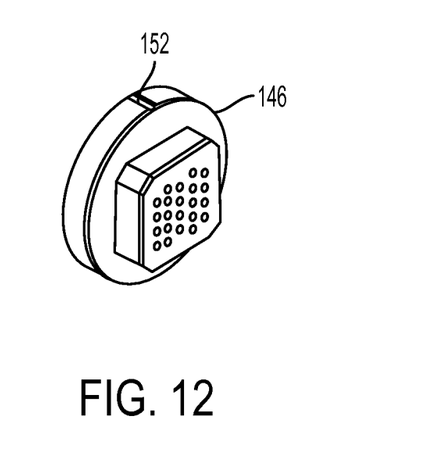
FIG. 12 is a perspective view of a lower screen portion of the drain fitting of FIG. 3.

In addition, and with additional reference to FIGS. 11 and 12, the drain fitting 100 includes two screens 144, 146 to help prevent debris from entering the valve assembly 128 from inside the main line 104 of the irrigation system 102 (via the inlet 132) (but to also allow water to flow through the screen (via openings) from out of the drain fitting 100 as desired). An upper screen 144 is located toward an end portion of the neck 116, and toward the end of the upper engagement portion 120 (and, for example, coupled to the upper engagement portion 120 via rib 150, etc.). In particular, in the illustrated embodiment, the upper screen 144 is coupled to an end portion of the upper engagement portion 120 (and generally raised, elevated, etc. there above). And, a lower screen 146 is located generally within the neck 116, and toward an end of the lower engagement portion 122 (and, for example, coupled to the upper engagement portion 120 via rib 152, etc.). And in particular in the illustrated embodiment, the lower screen 146 is coupled to an end portion of the lower engagement portion 122 (and is generally flush with or raised, elevated, etc. there above). The screens 144, 146 may be formed from any suitable material.

In use, the drain fitting 100 can be installed in a low point in the main line 104 of the irrigation system 102 to allow for draining all components of the irrigation system 102 through the drain fitting 100. For example, the T-fitting 110 can be coupled to the main line 104 (e.g., during installation of the irrigation system 102, as a retrofit to the irrigation system 102, etc.) (e.g., via glue, epoxy, mechanical straps 148 (see FIG. 2), etc.), and the drain fitting 100 can then be inserted into the T-fitting 110. The drain fitting 100 is oriented, via the T-fitting 110, generally below the main line 104 (e.g., generally upside down, etc.). In particular, the grip potion 114 of the drain fitting 100 is located generally below the T-fitting 110 and the main line 104 (e.g., directly below the main line 104 as shown in the system 102 in FIG. 1, at an angle of about a forty-five degrees relative to the main line 104, at angles therebetween, etc.). This facilitates draining of the irrigation system 102, via gravity, through the drain fitting 100 when the irrigation system 102 is not in use. In some aspects, multiple drain fittings (e.g., multiple ones of the drain fitting 100, etc.) may be installed in various different locations in the irrigation system 102 to allow for draining all components of the irrigation system 102 (e.g., in various different locations along the main line 104, etc.). Here, the additional drain fittings may be located adjacent (or even in) particular components of the irrigation system 102 that need freeze protection (e.g., sprinkler heads, zone valves, backflow preventers, other components, etc.).

As previously described, the neck 116 of the drain fitting 100 includes the two different sized engagement portions 120, 122 for use in coupling the drain fitting 100 to the T-fitting 110 of the main line 104. In some aspects of the present disclosure, when the larger, lower engagement portion 122 is used to couple the drain fitting 100 to the T-fitting 110 (e.g., when the size of the T-fitting 110 and the main line 104 correspond to the size of the larger, lower engagement portion 122, etc.), the upper engagement portion 120 and the screen 144 located at the end of the neck 116 are allowed to extend generally into the main line 104 of the irrigation system 102. Here, the drain fitting 100 operates to drain water from the main line 104 only until the water level falls below the inlet 132 and screen 144. As such, the drain fitting 100 does not drain all of the water from the main line 104, but enough to generally inhibit damage if the water freezes. In addition, when the irrigation system 102 is active, water flowing through the main line 104 also acts to clean the screen 144 at the end portion of the neck 116.

In other aspects of the present disclosure, when the larger, lower engagement portion 122 is used to couple the drain fitting 100 to the T-fitting 110 (e.g., when the size of the T-fitting 110 and the main line 104 correspond to the size of the larger, lower engagement portion 122, etc.), the upper engagement portion 120 and the screen 144 located at the end of the neck 116 are removed from the drain fitting 100. For example, as shown in FIGS. 9 and 10, the upper engagement portion 120 can be cut, or otherwise removed, from the drain fitting 100. Here, when the drain fitting 100 is then installed into the T-fitting 110, the inlet 132 of the drain fitting 100 (now located generally at the end of the lower engagement portion 122) operates to substantially drain all water from the main line (as the inlet 132 is now located closer to a sidewall of the main line 104 when the drain fitting 100 is installed in the T-fitting 110). In addition, in this embodiment the lower screen 146 remains with the lower engagement portion 122 (it is not removed with the upper engagement portion 120) to help inhibit debris from entering the valve assembly 128 from inside the main line 104 of the irrigation system 102 (even through the upper engagement portion 120 and upper screen 144 are removed from the drain fitting 100). Further, when the irrigation system 102 is active, water flowing through the main line 104 also acts to clean the screen 146, now at the end portion of the neck 116 (e.g., as cut, etc.).

Figure 13:
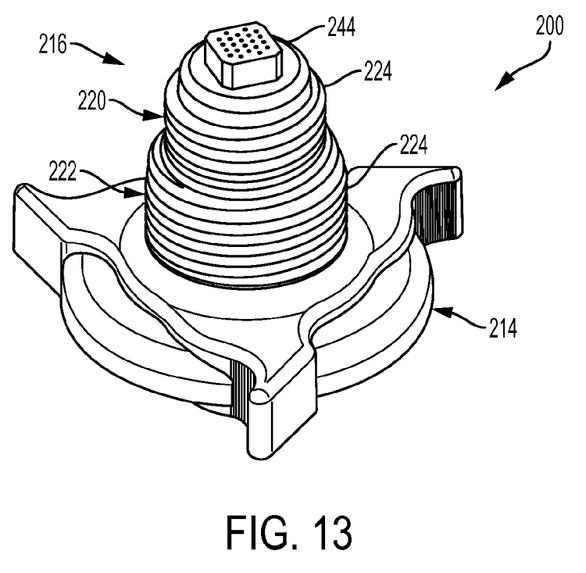
FIG. 13 is a perspective view of another exemplary embodiment of a drain fitting of the present disclosure suitable for use in the irrigation system of FIG. 1.
Figure 14:
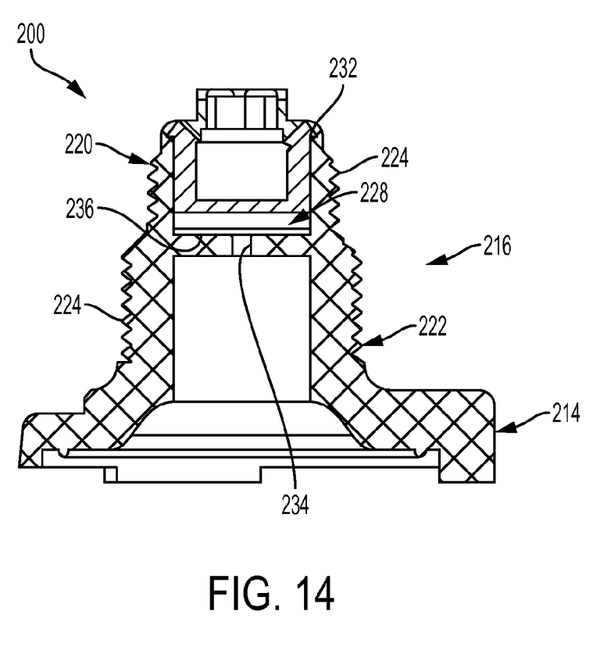
FIG. 14 is a section view of the drain fitting of FIG. 13.
Figure 15:
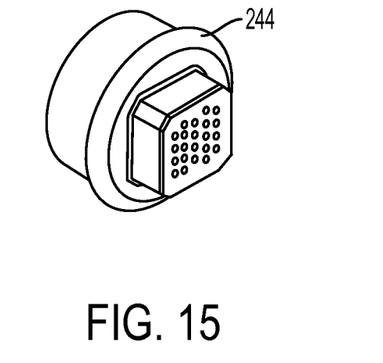
FIG. 15 is a perspective view of a screen portion of the drain fitting of FIG. 13.

FIGS. 13-15 illustrate another exemplary embodiment of a drain fitting 200 including one or more aspects of the present disclosure. The drain fitting 200 is substantially similar to the drain fitting 100 shown in FIGS. 1-12. And, the drain fitting 200 can be used in the irrigation system 100 illustrated in FIG. 1, for example, to drain water from the main line 104 (and, indirectly, from the lateral lines (e.g., the lateral line 106, etc.) and the sprinkler heads (e.g., the sprinkler head 108, etc.) of the irrigation system 102), through the T-fitting 110, when the irrigation system 102 is not in use.

The drain fitting 200 generally includes a grip portion 214 for grasping the drain fitting 200 and a neck 216, extending away from the grip portion 214, for coupling the drain fitting 100 to another fitting (e.g., the T-fitting 110 of the main line 104 in system 100, etc.). The neck 216 of the drain fitting 200 also includes two differently sized engagement portions 220, 222 for use in coupling (e.g., via threads 224, etc.) the drain fitting 200 to another fitting. And, a valve assembly 228 (and valve portion 236) is disposed generally within the neck 216 of the drawing fitting 200, generally between an inlet 232 of the drain fitting 200 and an outlet 234 of the drain fitting 200, for controlling flow of water through the drawing fitting 200 (as previously described in connection with drawing fitting 100).

In this embodiment, the drain fitting 200 includes a single screen 244. And, the valve assembly 228 (and, specifically, the valve portion 236) is disposed adjacent (e.g., generally below, etc.) the single screen 244.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that exemplary embodiments may be embodied in many different forms, and that neither should be construed to limit the scope of the disclosure. In some exemplary embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Or for example, the term "about" as used herein when modifying a quantity of an ingredient or reactant of the invention or employed refers to variation in the numerical quantity that can happen through typical measuring and handling procedures used, for example, when making concentrates or solutions in the real world through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A drain fitting for use in an irrigation system for draining water from the irrigation system, the drain fitting comprising:
    first and second threaded engagement portions each configured to couple the drain fitting to the irrigation system, the first engagement portion having a first diameter and the second engagement portion having a second diameter different from the first diameter; and
    a screen disposed at least partly within the first engagement portion;
    a channel extending longitudinally through the first and second engagement portions for draining water from the irrigation system when the drain fitting is coupled to the irrigation system, the channel defining an interior portion of each of the first and second engagement portions, an exterior portion of each of the first and second engagement portions comprising thread configured to couple the drain fitting to the irrigation system;
    a first screen coupled to the first engagement portion, the first screen configured to inhibit debris from entering the channel at the first engagement portion; and
    a second screen coupled to the second engagement portion, the second screen configured to inhibit debris from entering the channel at the second engagement portion.

2. The drain fitting of claim 1, wherein the second screen is coupled to an end portion of the second engagement portion, and/or wherein the second screen is coupled to an end portion of the second engagement portion.

3. The drain fitting of claim 2, wherein the first screen is raised generally above the end portion of the first engagement portion, and/or wherein the second screen is raised generally above the end portion of the second engagement portion.

4. The drain fitting of claim 1, wherein the first engagement portion is removable from the drain fitting.

5. The drain fitting of claim 1, further comprising a valve assembly for selectively allowing and inhibiting drainage of water through the drain fitting.

6. A drain fitting for use in an irrigation system for draining water from the irrigation system, regardless of pipe size in the irrigation system, the drain fitting comprising:
    a grip portion;
    a neck coupled to the grip portion;
    a first screen; and
    a second screen;
    the neck defining a first engagement portion having a first diameter capable of coupling the drain fitting to a first pipe of the irrigation system having a diameter corresponding to the first diameter of the first engagement portion, the first screen coupled to the first engagement portion;
    the neck defining a second engagement portion having a second diameter, different from the first diameter, capable of coupling the drain fitting to a second pipe of the irrigation system having a diameter corresponding to the second diameter of the second engagement portion, the second screen coupled to the second engagement member at a location adjacent the first engagement member; and
    the first engagement portion coupled to the second engagement portion, and the second engagement portion coupled to the grip portion such that the second engagement portion is disposed longitudinally between the grip portion and the first engagement portion.

7. The drain fitting of claim 6, wherein the first screen is coupled to an end portion of the first engagement portion of the neck and disposed at least partly within the first engagement portion.

8. The drain fitting of claim 7, wherein the first screen is raised generally above the end portion of the first engagement portion.

9. The drain fitting of claim 7, wherein the second screen is coupled to an end portion of the second engagement portion of the neck.

10. The drain fitting of claim 9, wherein the second screen is raised generally above the end portion of the second engagement portion.

11. The drain fitting of claim 7, wherein the first engagement portion is removable from the drain fitting.

12. The drain fitting of claim 11, further comprising a valve assembly for selectively allowing and inhibiting drainage of water through the drain fitting.

13. The drain fitting of claim 7, wherein the grip portion of the drain fitting includes an outlet for discharging water from the drain fitting, the drain fitting further comprising a filter disposed generally over the outlet for inhibiting unwanted debris from entering the drain fitting through the outlet.

14. A drain fitting for use in an irrigation system for draining water from the irrigation system, the drain fitting comprising:
    at least two threaded engagement portions, each having a different diameter and each capable of coupling the drain fitting to a different pipe of the irrigation system, wherein each of the different pipes of the irrigation system has a different diameter;
    a channel extending longitudinally through the at least two threaded engagement portions for draining water from the irrigation system when the drain fitting is coupled to one of the pipes of the irrigation system, the channel defining an interior portion of each of the at least two threaded engagement portions; and
    two or more screens disposed in communication with the channel, a first one of the two screens coupled to an end portion of one of the at least two threaded engagement portions and a second one of the two or more screens coupled to an end portion of another one of the at least two threaded engagement portions.

15. The drain fitting of claim 14, wherein at least one of the at least two threaded engagement portions is removable from the drain fitting.

16. The drain fitting of claim 15, wherein at least one of the two or more screens is disposed at least partly within at least one of the at least two threaded engagement portions.

17. The drain fitting of claim 16, wherein at least one of the two screens is disposed generally within the at least one of the at least two or more threaded engagement portions that is removable from the drain fitting.

* * * * *